（12) United States Patent
Baughman et al.

(10) Patent No.: US 12,095,575 B2
(45) Date of Patent: Sep. 17, 2024

(54) VEHICLE AND POWER MANAGEMENT USING POWER OVER ETHERNET DEVICES

(71) Applicant: INTERNATIONAL BUSINESS MACHINES CORPORATION, Armonk, NY (US)

(72) Inventors: Aaron K. Baughman, Cary, NC (US); Debra Scott, Redwood City, CA (US); Michael Egger, Niederwil (CH); Christian Eggenberger, Wil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 17/708,396

(22) Filed: Mar. 30, 2022

(65) Prior Publication Data

US 2023/0318858 A1    Oct. 5, 2023

(51) Int. Cl.
*H04L 12/10* (2006.01)
*G05B 13/02* (2006.01)
*G05D 1/00* (2006.01)

(52) U.S. Cl.
CPC ............ *H04L 12/10* (2013.01); *G05B 13/027* (2013.01); *G05D 1/0022* (2013.01)

(58) Field of Classification Search
CPC ..... H04L 12/10; G05B 13/027; G05D 1/0022
See application file for complete search history.

(56) References Cited

U.S. PATENT DOCUMENTS 7,440,025 B2    10/2008    Cheng
7,650,519 B1 *   1/2010    Hobbs ................. G06F 3/038
                                              713/320

(Continued)

FOREIGN PATENT DOCUMENTS

CN    102789115 A    11/2012
CN    107409053 A    11/2017

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Hussein Elchanti
(74) *Attorney, Agent, or Firm* — CUENOT, FORSYTHE & KIM, LLC

(57) ABSTRACT

A server for regulating power from a Power-over-Ethernet switch to a plurality of vision sensors includes the following operations. An evaluation of individual contributions that each of the plurality of vision sensors makes to operational efficiency of the vision system is performed. Information indicative of a degradation condition to the plurality of vision sensors is received from the plurality of vision sensors. An amount of power needed to be supplied from the switch to alleviate the degradation condition of the plurality of vision sensors is estimated based upon the information indicative of the degradation condition. A determination is made that a total amount of power supplied from the switch exceeds an available amount of power capable of being supplied from the switch. Power from the switch to the plurality of vision sensors is individually regulated in real-time using a prioritization determined according to the evaluation.

20 Claims, 9 Drawing Sheets

(56) References Cited

U.S. PATENT DOCUMENTS

| | | | |
|---|---|---|---|
| 8,352,754 | B2 | 1/2013 | Chin |
| 9,278,670 | B2 | 3/2016 | Hattori et al. |
| 10,117,116 | B1* | 10/2018 | Shaw ................ H04W 24/02 |
| 10,474,213 | B1 | 11/2019 | Brown et al. |
| 10,482,763 | B1* | 11/2019 | Pomatto ............. G08G 1/005 |
| 10,666,049 | B2 | 5/2020 | Vavilala |
| 11,909,709 | B1* | 2/2024 | Cheng ............ H04L 41/0213 |
| 2006/0149978 | A1* | 7/2006 | Randall ............. G06F 1/3215 |
| | | | 713/300 |
| 2014/0129154 | A1* | 5/2014 | Cooper ............. B61L 23/042 |
| | | | 702/34 |
| 2016/0174084 | A1* | 6/2016 | Kimura ............ H04W 24/04 |
| | | | 455/522 |
| 2017/0230080 | A1 | 8/2017 | Tarn |
| 2018/0150127 | A1 | 5/2018 | Wendt et al. |
| 2019/0364743 | A1* | 12/2019 | Lys .................... A01G 7/045 |
| 2020/0235607 | A1* | 7/2020 | Kanarellis ......... H04L 43/0811 |
| 2022/0006953 | A1 | 1/2022 | Kagganti et al. |
| 2022/0094072 | A1 | 3/2022 | Kalavakuru et al. |
| 2024/0078549 | A1* | 3/2024 | Karadkhelkar .... G06Q 20/4014 |

OTHER PUBLICATIONS

"Intelligent Power Distribution Switch," IP.com Prior Art Database, Technical Disclosure No. IPCOM000183398D, May 21, 2009, 2 pages.

Shajiee, S., "Direct Optical Ice Sensing and Closed-Loop Controller Design for Active De-Icing of Wind Turbines Using Distributed Heating," Doctoral Dissertation, University of Colorado at Boulder, 2015, p. 133.

Zhang, A. et al., "Convolutional Neural Networks, Padding and Stride," Dive Into Deep Learning, Release 0.17.0, Chap. 6.3, Jul. 26, 2021, arXiv preprint arXiv:2106.11342, pp. 237-240, [see also <https://d2l.ai/chapter_convolutional-neural-networks/padding-and-strides.html>].

Das, A., "Soildnet: Soiling degradation detection in autonomous driving," arXiv preprint arXiv:1911.01054, Nov. 4, 2019, 9 pg.

"How to Remove & Prevent Security Camera Condensation: 10 Easy & Proven Ways," Reolink Blog [retrieved Mar. 11, 2022], retrieved from the Internet: <https://reolink.com/security-camera-condensation-causes-solutions/>, 6 pg.

Lazic, N. et al., "Data center cooling using model-predictive control," Advances in Neural Information Processing Systems, 2018, vol. 31, 10 pg.

Pu, T. et al., "Power flow adjustment for smart microgrid based on edge computing and multi-agent deep reinforcement learning," Journal of Cloud Computing, Dec. 2021, vol. 10, No. 1, pp. 1-13.

Uricar, M. et al., "Let's get dirty: Gan based data augmentation for camera lens soiling detection in autonomous driving," InProceedings of the IEEE/CVF Winter Conference on Applications of Computer Vision, 2021, pp. 766-775.

WIPO Appln. No. PCT/CN2023/084656, International Search Report and Written Opinion, 7 pg.

* cited by examiner

Input

| 0 | 0 | 0 | 0 | 0 |
|---|---|---|---|---|
| 0 | 0 | 1 | 2 | 0 |
| 0 | 3 | 4 | 5 | 0 |
| 0 | 6 | 7 | 8 | 0 |
| 0 | 0 | 0 | 0 | 0 |

\*

Kernel

| 0 | 1 |
|---|---|
| 2 | 3 |

=

Output

| 0 | 3 | 8 | 4 |
|---|---|---|---|
| 9 | 19 | 25 | 10 |
| 21 | 37 | 43 | 16 |
| 6 | 7 | 8 | 0 |

FIG. 3A

Input

| 0 | 0 | 0 | 0 | 0 |
|---|---|---|---|---|
| 0 | 0 | 1 | 2 | 0 |
| 0 | 3 | 4 | 5 | 0 |
| 0 | 6 | 7 | 8 | 0 |
| 0 | 0 | 0 | 0 | 0 |

\*

Kernel

| 0 | 1 |
|---|---|
| 2 | 3 |

=

Output

| 0 | 8 |
|---|---|
| 6 | 8 |

FIG. 3B

Algorithm 1: Q learning

Init Q(s,a) arbitrarily for all s,a
Read initial state s
Repeat until convergence
    sample and execute the action a
    observe the new state s' and reward R(s,a,s')
    $Q[s,a] = Q[s,a] + \alpha \ (R(s,a,s') + \gamma \ \max_{a'} Q[s',a'] - Q[s,a])$
    $s = s'$

FIG. 4

```python
def create_data_model():
    """Create the data for the example."""
    data = {}
    weights = [48, 30, 19, 36, 36, 27, 42, 42, 36, 24, 30]
    data['weights'] = weights
    data['items'] = list(range(len(weights)))
    data['bins'] = data['items']
    data['bin_capacity'] = 100
    return data

# Create the mip solver with the SCIP backend.
    solver = pywraplp.Solver.CreateSolver('SCIP')

# Variables
# x[i, j] = 1 if item i is packed in bin j.
x = {}
for i in data['items']:
    for j in data['bins']:
        x[(i, j)] = solver.IntVar(0, 1, 'x_%i_%i' % (i, j))

# y[j] = 1 if bin j is used.
y = {}
for j in data['bins']:
    y[j] = solver.IntVar(0, 1, 'y[%i]' % j)

# Constraints
# Each item must be in exactly one bin.
for i in data['items']:
    solver.Add(sum(x[i, j] for j in data['bins']) == 1)

# The amount packed in each bin cannot exceed its capacity.
for j in data['bins']:
    solver.Add(
        sum(x[(i, j)] * data['weights'][i] for i in data['items']) <= y[j] *
        data['bin_capacity'])

# Objective: minimize the number of bins used.
solver.Minimize(solver.Sum([y[j] for j in data['bins']]))

status = solver.Solve()
if status == pywraplp.Solver.OPTIMAL:
    num_bins = 0.
    for j in data['bins']:
        if y[j].solution_value() == 1:
            bin_items = []
            bin_weight = 0
            for i in data['items']:
                if x[i, j].solution_value() > 0:
                    bin_items.append(i)
                    bin_weight += data['weights'][i]
            if bin_weight > 0:
                num_bins += 1
                print('Bin number', j)
```

FIG. 5

VEHICLE AND POWER MANAGEMENT USING POWER OVER ETHERNET DEVICES

BACKGROUND

The present invention relates to remote controlled vehicle movement systems, and more specifically, to managing power priorities to powered devices using Power over Ethernet.

Remote Controlled Vehicle Movement (RCVM) systems, such as Automated Valet Parking Systems (AVPS), use vehicle odometry data to assist vehicles in moving from one location to another location. An example usage of an RCVM system involves the parking of vehicles by a vehicle manufacturer. After a new vehicle has been successfully calibrated and tested in the final production stage, the vehicle is moved and temporarily parked oftentimes involving thousands of drivers, over distances ranging from several hundred meters to several kilometers in huge parking areas on the factory premises. After the new vehicle has been parked, the drivers are driven back to a staging area by a shuttle bus to move the next vehicle.

In this example, through the use of an RCVM system, many of these operations can be automated. Moreover, the RCVM system can more efficiently route vehicles, identify parking locations, as well as provide other known benefits. Another application involves a typical "valet" situation at a shopping mall or off-street parking in which a driver exits the vehicle at a predetermined location and the RCVM system aids the vehicle in parking itself. Other examples include the automated shifting of vehicles in car dealerships, car workshops, and roll-on, roll-off vessels.

An RCVM system, such as an AVPS, typically involves both AVPS-compliant vehicles (e.g., vehicles capable of autonomous driving) and AVPS-compliant parking facilities. The ultimate goal of a AVPS is to provide safe and reliable Level 4 driverless operation of one or more vehicles in a defined parking facility. The benefits of an AVPS can include accident reduction, lowering energy consumption and $CO_2$ emissions of vehicles searching for available parking spaces, and effectively utilize land by densely parking vehicles in the available space.

The infrastructure associated with the parking facilities of a typical AVPS includes multiple odometry-related sensors (e.g., video cameras, RFID sensors, LIDAR) that identify the location of the vehicle within the physical space covered by the AVPS. These sensors are used to detect the vehicles themselves, as well as other objects, such as people, animal, or unexpected obstructions. These sensors, in addition to identifying the locations of these objects, can also be used to identify empty/occupied parking spaces as well as pathways to and from these parking spaces. For safety, commercial, and reputations reasons, these sensors and the overall solution require high availability.

While the reliability of the sensors themselves are generally quite high, the nature of the use of these sensors (i.e., most frequently in an outdoor environment) exposes these sensors to adverse environmental effects (i.e., degradation conditions), such as the weather. For example, the functionality of a video camera can be subject to the weather such as with fog, snow, sandstorms, pollen drifts, etc. Even good weather can pose a problem with light being reflected into a camera lens (known as flaring). Another environmental condition that impacts video cameras is low-light situations, such as a very cloudy day or during the night. There are many known solutions for addressing adverse environmental conditions. For example, a camera may include a heater (to address ice/snow), wiper lens (to address moisture), lighting (to address low light levels), and/or a misting device (to address dirt such as bird droppings, flying insects, pollen, sand, railroad dust, etc.). Additionally, these solutions also include intelligence to recognize when the functionality of the device is being degraded and when to implement the remedial action (e.g., mist the lens when dirty).

A problem with these remediation solutions is that they all require additional power beyond what is required for baseline operations. Typically, the power to a sensor can be provided by the wired Ethernet connection between the sensor itself and switch/router (hereinafter referred to as a switch) to which the sensor is connected. Power over Ethernet (PoE) is a known and well-developed technology that provides electrical power from a PoE switch over twisted-pair Ethernet cable to powered devices. There are alternative approaches to providing electric power to powered devices, such as sensors, but these alternative approaches have drawbacks. For example, the powered devices can be powered using common electrical outlets (e.g., 120V AC). However, such an approach requires the running of power conduit to all locations that may require it, which can significantly increase the cost of an installation of an AVPS. Another alternative approach employs solar-powered devices. However, the use of solar-powered devices can also significantly increase the cost of an installation.

Despite PoE being a desirable approach in an AVPS, there are still downsides to using PoE. In particular, a PoE switch can be limited to the amount of power capable of being provided. Typical PoE switches have between 4 and 48 PoE ports capable of supplying power. Using the IEEE 802.3bt Type 4 standard as an example, the amount of power capable of being delivered from the PoE switch is 90 W with the expected power delivered to the powered device being 71.3 W. However, for cost reasons, many PoE switches are not designed to provide full power on each PoE port. In these situations, the PoE standard permits power demotion whereby the PoE switch will reduce the power provided to a powered device. This standard also includes the capability of the PoE switch to communicate with the powered device to indicate that the powered device will be receiving a reduced amount of power, which allows the powered device to reduce the amount of power being drawn. Otherwise, if the powered device continues to draw more power than permitted, the PoE switch is configured to shut down the powered device.

If the PoE switch is capable of providing maximum power being requested by all ports, then the PoE switch can be used in an autonomous mode. However, if the powered devices connected to the ports are requesting more power than available, the PoE standard provides for use of a controller to use the power switch's I2C register to manage power priorities. While current power management solutions allow for static prioritization of the various powered devices connected to a PoE switch, a need exists for dynamic management of the prioritization of the power provided by the PoE switch in an automated valet system.

SUMMARY

A computer-implemented process for regulating power from a Power-over-Ethernet (PoE) switch to a vision system including plurality of PoE vision sensors includes the following operations. Using a convolutional neural network, an evaluation of individual contributions that each of the plurality of PoE vision sensors makes to operational efficiency of the vision system is performed. Information indicative of a degradation condition to the at least one of the plurality of PoE vision sensors is received from at least one of the plurality of PoE vision sensors. An amount of power needed to be supplied from the PoE switch to alleviate the degradation condition of the at least one of the plurality of PoE vision sensors is estimated based upon the information indicative of the degradation condition. A determination is made that a total amount of power supplied from the PoE switch exceeds an available amount of power capable of being supplied from the PoE switch. Based upon the determination, power from the PoE switch to the plurality of PoE vision sensors is individually regulated in real-time using a prioritization determined according to the evaluation.

A remote controlled vehicle movement (RCVM) server includes a computer hardware system configured to regulate power from a Power-over-Ethernet (PoE) switch to a vision system including plurality of PoE vision sensors connected to the PoE switch and is configured to perform the following. Using a convolutional neural network, an evaluation of individual contributions that each of the plurality of PoE vision sensors makes to operational efficiency of the vision system is performed. Information indicative of a degradation condition to the at least one of the plurality of PoE vision sensors is received from at least one of the plurality of PoE vision sensors. An amount of power needed to be supplied from the PoE switch to alleviate the degradation condition of the at least one of the plurality of PoE vision sensors is estimated based upon the information indicative of the degradation condition. A determination is made that a total amount of power supplied from the PoE switch exceeds an available amount of power capable of being supplied from the PoE switch. Based upon the determination, power from the PoE switch to the plurality of PoE vision sensors is individually regulated in real-time using a prioritization determined according to the evaluation.

A computer program product includes a computer readable storage medium having stored therein program code for regulating power from a Power-over-Ethernet (PoE) switch to a vision system including plurality of PoE vision sensors. The program code, which when executed by a computer hardware system, cause the computer hardware system to perform the following. Using a convolutional neural network, an evaluation of individual contributions that each of the plurality of PoE vision sensors makes to operational efficiency of the vision system is performed. Information indicative of a degradation condition to the at least one of the plurality of PoE vision sensors is received from at least one of the plurality of PoE vision sensors. An amount of power needed to be supplied from the PoE switch to alleviate the degradation condition of the at least one of the plurality of PoE vision sensors is estimated based upon the information indicative of the degradation condition. A determination is made that a total amount of power supplied from the PoE switch exceeds an available amount of power capable of being supplied from the PoE switch. Based upon the determination, power using a prioritization determined according to the evaluation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 3A illustrates two-dimensional cross-correlation with padding.

FIG. 3B illustrates cross-correlation with strides of 3 and 2 for height and width, respectively.

FIG. 4 illustrates an example Q learning algorithm for use with the machine learning engine of FIG. 1B.

FIG. 5 illustrates pseudocode for implementing a bin packing algorithm for use with the machine learning engine of FIG. 1B.

DETAILED DESCRIPTION

Figure 1A:
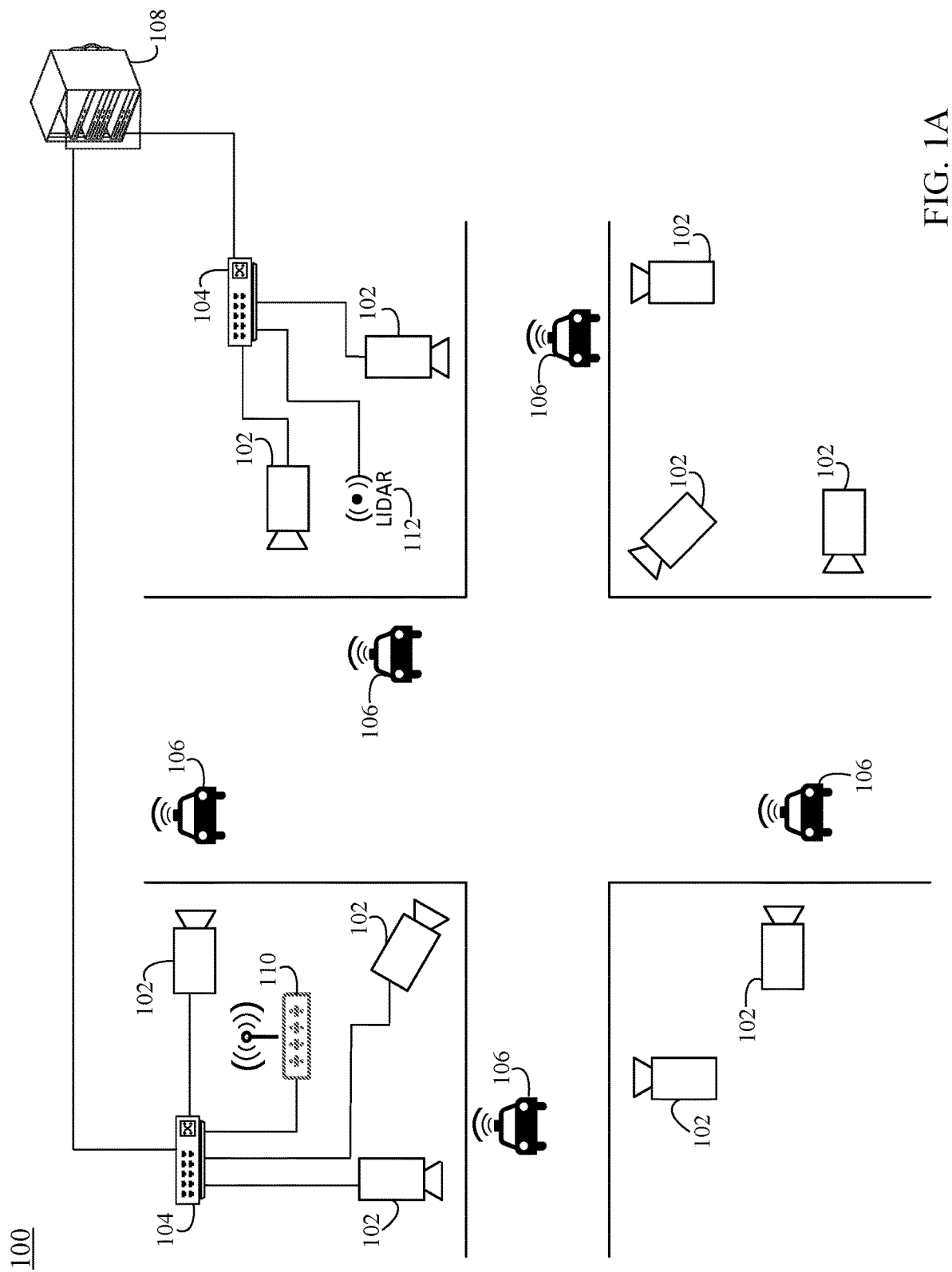
FIG. 1A is a block diagram illustrating an example system architecture for a Remote Controlled Vehicle Movement (RCVM) system.
Figure 1B:
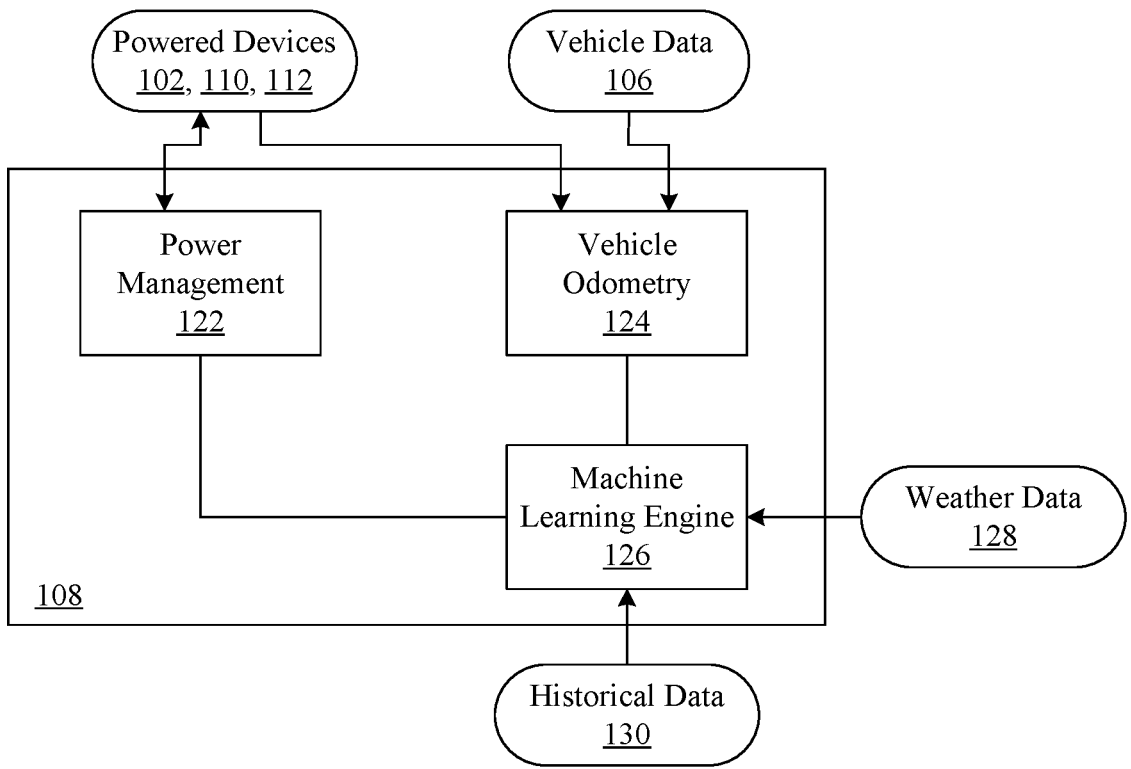
FIG. 1B is a block diagram illustrating an example RCVM server for use with the system architecture illustrated in FIG. 1A.
Figure 2:
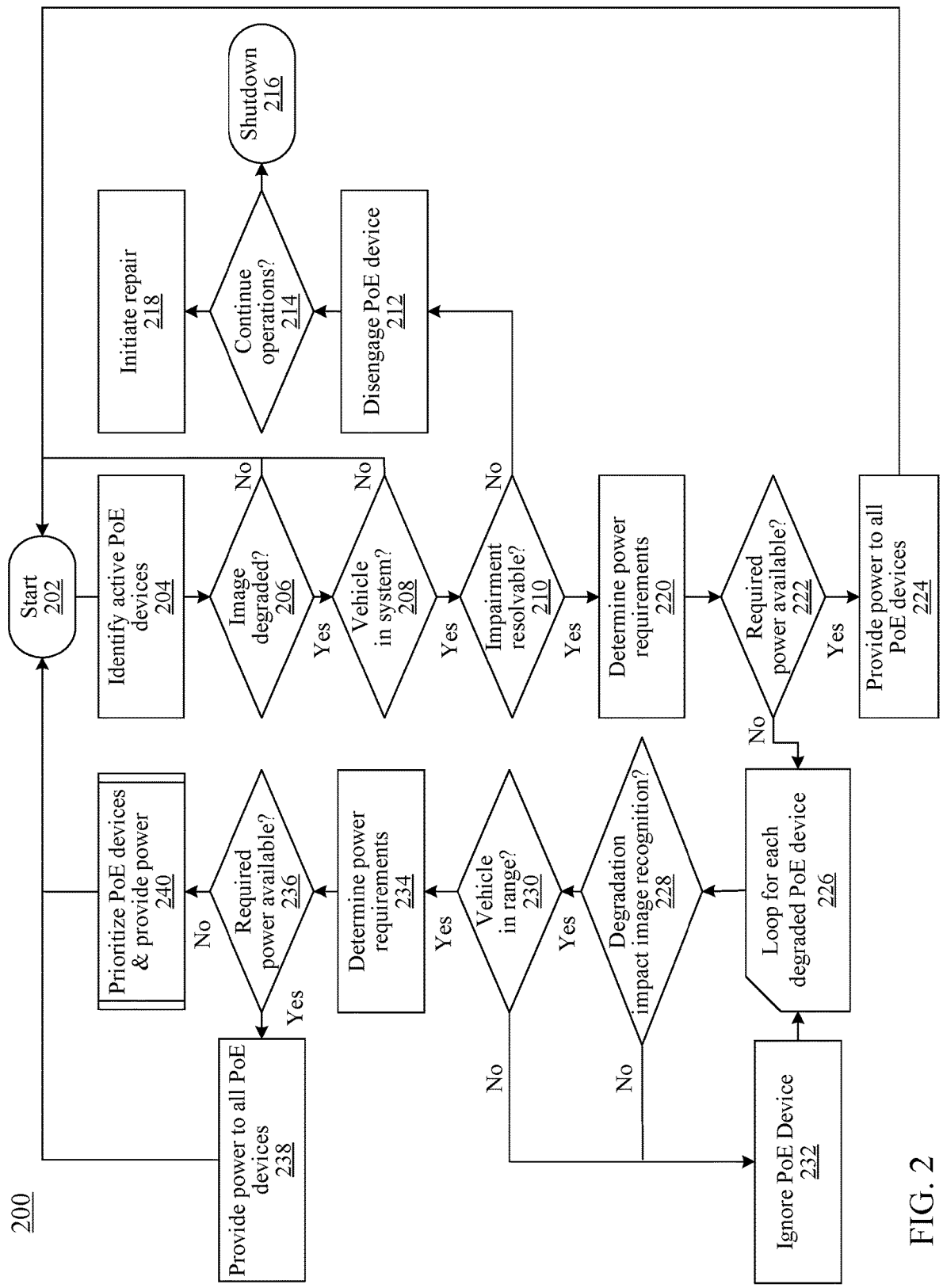
FIG. 2 is a block diagram illustrating an example method using the architecture of FIGS. 1A, 1B.

Reference is made to FIG. 1A, 1B and FIG. 2, with respectively disclose an automated Remote Controlled Vehicle Movement (RCVM) system 100 and method 200 of using the same. A RCVM server 108 can include a computer hardware system configured to regulate power from a Power-over-Ethernet (PoE) switch 104 to a vision system including plurality of PoE vision sensors 102 connected to the PoE switch 104. Using a convolutional neural network 126, an evaluation of individual contributions that each of the plurality of PoE vision sensors 102 makes to operational efficiency of the vision system can be performed. Information indicative of a degradation condition to the at least one of the plurality of PoE vision sensors 102 can be received from at least one of the plurality of PoE vision sensors 102, and an amount of power needed to be supplied from the PoE switch 104 to alleviate the degradation condition of the at least one of the plurality of PoE vision sensors 102 can be estimated based upon the information indicative of the degradation condition. A determination can be made that a total amount of power supplied from the PoE switch 104 exceeds an available amount of power capable of being supplied from the PoE switch 104, and based upon the determination, power from the PoE switch 104 to the plurality of PoE vision sensors 102 can be individually regulated in real-time using a prioritization determined according to the evaluation.

An example of a RCVM system 100 is an Automated Valet Parking System (AVPS) of the kind described in ISO/DIS 23374-1. Consistent with a conventional AVPS, the present RCVM system 100 is configured to manage the automated movement of connected vehicles 106 through a particular defined region (e.g., a parking lot).

With reference to FIG. 1A, known elements of a RCVM system 100 includes a number of powered devices 102, 110, 112 connected by Power over Ethernet (PoE) switches 104 to one or more central RCVM servers 108. Although not limited in this manner, the powered devices can include wireless access points 110 and odometry-related sensors 102, 112. The wireless access points 110, for example, can be used by the RCVM system 100 to communicate with the connected vehicles 106. Although not illustrated, other powered devices connected to the PoE switches 104 can include PoE LED lighting. As used herein, "odometry-related sensors" include devices and/or sensors configured to provide data indicative of a location of a vehicle 106. The odometry-related sensors can include RFID or Light Detection and Ranging (LIDAR) sensors 112 as well as PoE video sensors (e.g., cameras) 102. All of the video sensors 102 are collectively referred to as the vision system.

The RCVM system 100 is not limited as to a particular type of video sensor 102 aside from the video sensor 102 being a PoE-type camera having different power requirements hereinafter referred to as PoE video sensor 102. For example, many PoE video sensors 102 include climate control capabilities that require additional power when activated. Examples of climate control capabilities include a heater to address ice/snow, wiper lens to address moisture, and/or a misting device to address dirt such as bird droppings, flying insects, pollen, sand, railroad dust, etc. An additional climate control capability involves the PoE video sensor 102 having a light (e.g., infrared (IR) illumination) for use in low light-level conditions. Thus, the PoE video sensor 102 employed by the present RCVM system 100 includes not only a base-level power requirement (i.e., the power needed to run the video operations of the camera) but also one or more additional optional power requirements based upon the usage of these additional climate control capabilities—also referred to herein as mitigation functions.

Referring to FIG. 1B, additional aspects of the RCVM server 108 are illustrated. Consistent with conventional RCVM systems, the RCVM server 108 includes a vehicle odometry module 124 that is configured to receive odometry data from one or both of the powered devices 112 (e.g., odometry-related sensors such as the video sensors 102 and LIDAR sensors 112) connected to the PoE switch(es) 104 and the vehicles 106 themselves via, for example, and an Electronic Control Unit (ECU) embedded within the vehicle 106.

The RCVM server 108 includes a machine learning engine 126 that uses input such as weather data 128, historical data 130, and data supplied by the vehicle odometry module 124. The RCVM server 108 is not limited as to the source of the weather data 128. The weather data 128 can be, for example, received from external sources. In addition to or alternatively, weather data 128 can be received from the connected devices 112. Although not limited in this manner, weather data 128 can include wind direction, wind strength, temperature, humidity, barometric pressure, and light conditions. Vehicle data 106 can include one or more of: the current location of the vehicles 106, a future location of the vehicles 106, a determined path of the vehicles 106, and the location of any obstructions within the path(s). Historical data 126 can include past analysis by the machine learning engine 126.

The power management module 122 interacts with the powered devices 112 via the PoE switch(es) 104 and is configured to manage the power consumption of the powered devices 112. Operations of the power management module 122 and machine learning engine 126 are discussed in more detail with reference to FIGS. 2-5.

Referring to FIG. 2, the process 200 starts at 202, and in 204, all active PoE devices 102, 110, 112 within the RCVM system 100 are identified, and the process 200 is not limited in the manner by which this is accomplished. As one example, each particular PoE switch 104 can send an interrogating signal (e.g., a heartbeat request) to each of the PoE devices 102, 110, 112 within the RCVM system 100 connected to that particular PoE switch 104. As another example, each of the PoE devices 102, 110, 112 can be configured to periodically send a signal to the PoE switch 104, which can indicate that the PoE device 102, 110, 112 is active.

In 206, for each of the active PoE vision sensors 102, a determination is made whether image degradation is occurring and/or will occur using data from the powered devices 112 and weather data 112B in conjunction with the machine learning engine 126. As used herein, the term "image degradation" refers to a quality of the image being provided that is lower than some predetermined standard. Although not limited in this manner, the predetermined standard is based upon a quality of the image not being sufficiently high to be relied upon. As another example, the predetermined standard is based upon a quality of the image indicating that immediate remediation is required. A further discussion of how image degradation is determined is found is the discussion as to FIGS. 3A, 3B.

In 208, the method 200 can include a determination, using data supplied by the vehicle odometry module 124, whether a vehicle 106 is within the bounds of the RCVM system 100. If not, then degradation of a particular PoE device 102 can optionally be ignored.

In 210, the method 200 can include a determination whether the impairment for the PoE device 102 is resolvable using one of the mitigation functions of the PoE device 102. In 212, upon determining that the impairment for the PoE device 102 is not resolvable in 210, the power management module 122 proceeds to disengage the PoE device 102 from the RCVM system 100 and issue an alert regarding the same. Although not limited in this manner, the alert can include an indication of the cause of the degradation and a prediction as to downtime.

In 214, the power management module 122 in conjunction with analysis from the machine learning engine 126, can determine whether the shutdown of the PoE device 102 will require a shutdown of the entire RCVM system 100 or whether operations can continue. This can involve having the artificial intelligence/machine learning engine 126 analyzing the current capabilities of the entire RCVM system 100 along with past historical data 130 to determine if the capabilities of the RCVM system 100 have been meaningfully impacted. The machine learning engine 126 can include, for example, deep learning technology such as artificial neural networks, which include Convolutional Neural Network (CNN).

If, in 216, a determination that operations cannot continue since the capabilities of the RCVM system 100 has been meaningfully impacted, a shutdown of the entire RCVM system 100 can be initiated in 216. However, if shutdown in not required, in 218, repair on the shutdown PoE device 102 can be initiated and the process 200 can continue. Although illustrated as being performed after 214, initiation of repair can be performed in conjunction with 212.

In 220, the power management module 122 determines the combined maximum power requirements of the active PoE devices 102, 110, 112 connected to a particular PoE switch 104. This determination involves determining the baseline power requirements for all of the active PoE devices 102, 110, 112 connected to the particular PoE switch 104 in addition to the power requirements for addressing the actual and/or predicted impairments of the active PoE devices 102, 110, 112. The power management module 122 can take into account different power requirements based upon different remedial functions needed to be performed. For example, the power needed to heat a PoE vision sensor 102 can differ from the power needed to operate wipers for the PoE vision sensor 102. Although not necessary, the combined power requirement can be determined for a particular time period. For example, the power management module 122 may determine a maximum combined power requirement within a particular slice of time.

In 222, the power management module 122 compares the maximum combined power requirement for all of the active PoE devices 102, 110, 112, as determined in 220, to the power capable of being provided by the PoE switch 104. If, based upon this comparison, sufficient power is capable of being provided by the PoE switch 104, in 224, the power management module 122 is configured to not adjust power being delivered to/received by the active PoE devices 102, 110, 112 and from the PoE switch 104 (e.g., operate in an autonomous mode as discussed above). In other words, the PoE switch 104 provides all of the needed power to the PoE devices 102, 110, 112.

Operations 226-238 are optional operations following a determination by the power management module 122 that the PoE switch 104 is incapable of providing sufficient power to the PoE devices 102, 110, 112. Specifically, the power management module 122 in conjunction with the machine learning engine 126 can make a determination for each active PoE devices 102, 110, 112 requiring power whether that particular PoE devices 102, 110, 112 requires power or can be ignored.

In 228, for the particular PoE vision sensor 102 being evaluated, the power management module 122 uses analysis generated by the machine learning engine 126 to determine if the amount of degradation to the particular PoE vision sensor 102 will meaningfully impact the image recognition operations of the RCVM system 100. For example, if the amount of degradation is sufficiently small and historical data, as interpreted by the machine learning engine 126, indicates that this amount of degradation does not have a meaningful impact on the image recognition operations, then a determination can be made that power is not required for the particular PoE vision sensor 102. In this instance, in 232, the power management module 122 will ignore this particular PoE vision sensor 102 and not provide the needed additional power to correct the degradation condition.

In 230, for the particular PoE vision sensor 102 being evaluated, the power management module 122 uses analysis generated by the machine learning engine 126 and the vehicle odometry module 124 to determine, based upon the actual and/or predicted location(s) of the vehicle(s) 106, that input from the particular PoE device 102 is not required for the image recognition operations of the RCVM system 100. For example, if the vehicle 106 is not anticipated to enter with a field of view covered by the particular PoE device 102, then the particular PoE device 102 being degraded can be ignored. Consequently, in 232, the power management module 122 instructs the PoE switch 104 to not provide the needed additional power for this particular PoE vision device 102 so as to correct the degradation condition.

Comparable to 220, in 234, the power management module 122 makes a determination as to the combined maximum power requirements of the active PoE devices 102, 110, 112 connected to a particular PoE switch 104. This determination differs only in PoE visions devices 102 identified in 232 will be ignored from this calculation.

Operation 236 is identical to operation 222 in that the power management module 122 compares the maximum combined power requirement for all of the active PoE devices 102, 110, 112, as determined in 234, to the power capable of being provided by the PoE switch 104. If, based upon this comparison, sufficient power is capable of being provided by the PoE switch 104, in 238, the power management module 122 is configured to not adjust power being delivered to/received by the active PoE devices 102 and from the PoE switch 104 with the exception of the PoE vision devices 102 being ignored in 232.

For the PoE devices 102 identified in 232, the power management module 122 can provide instructions to cause these PoE devices 102 to not draw additional power, and the power management module 122 is not limited in this manner as to how this accomplished. For example, the power management module 122 can instruct the PoE switch 104 to not provide the needed power. As another example, the power management module 122 can instruct the individual PoE devices 122 to temporarily disable their mitigation functions (e.g., mister, wiper, heater, etc.) so as to not draw power from the PoE switch 104.

If, in 240, a determination is made that the PoE switch 104 is not capable of providing sufficient power to all of the active powered devices (e.g., the active PoE devices 102, 110, 112) connected to the PoE switch 104, the power management module 122 in conjunction with the machine learning engine 126 will prioritize the active PoE devices 102, 110, 112 and respective mitigation function(s) for receiving power from the PoE switch 104 and regulate, in real-time, the power being provided to the active PoE devices 102, 110, 112. This prioritization process is discussed in more detail with regard to FIGS. 4 and 5.

Referring to FIGS. 3A, 3B, certain aspects of the machine learning engine 126 is disclosed. The machine learning engine 126 can include a distributed neurosymbolic system that applies Convolutional Neural Networks (CNN) to detection conditions of the PoE video sensors 102 using combinatorial padding and stride to progressively detect vision degradation (e.g., occlusions). Occlusion patterns caused, for example, by moisture, ice, and dirt, which can be otherwise difficult to detect. To avoid missing occlusions or negative weather conditions, the machine learning engine 126 can employ a bank of CNNs with different padding.

In general, a CNN uses a kernel (i.e., a matrix of weights) to extract certain features from an input image. Referring to FIG. 3A, the camera edge detection can be amplified by deepening of padding and extending the kernel. The same CNN can be applied to each image with varying padding. The padding can change in size to scope the search space for diminishing performance. The strides change the stepwise of windowing and convolutions with the CNN. In so doing, the image acquisition can be focused onto different step size windows on the image. The interlacing of steps increases the search space for occlusion detection.

Referring to FIG. 3B, broader weather effects can be detected by applying kernels at different strides. The number of combinations can be determined using the function:

$$\text{combinations} = \binom{S}{k}\binom{P}{j}$$

where the S (stride) choose k and P (padding) choose j inform the algorithm which combination to attempt. This combination of padding and strides refocuses the computing within a different orientation. Each of these combinations can be parallelized over available processing units. If one of the processing units detects bad weather effects, the particular PoE video sensor 102 is denoted within a structured scene representation. Scene representation is a process by which visual sensory data is converted into descriptions capable of being analyzed using machine learning.

Each recognized state is inserted into row and column form using the machine learning engine 126. For example, the structured scene representation includes columns for weather effects and rows for each camera. This creates a table representation of the condition of the PoE video sensor 102 and the environment. This structured scene representation can be trended over time. For example, if an action is taken, e.g., such as heating up the lens of a particular PoE video sensor 102, the results of this action can be noted in the structured scene representation. The structured scene representation can be used to allow for natural language questions about each of the PoE video sensors 102. The questions can be translated by language Recurrent Neural Networks with a bank of Long Short-Term Memory (LSTM) to translate test of the natural language question into queries, and a set of queries becomes a symbolic program. The sequence of queries generated by the LSTMs can be applied to the structured scene representation.

Using the structured scene representation, the power management module 122 in conjunction with the machine learning engine 126 can determine the severity of adverse effects of the weather/environment on the PoE video sensors 102 and the vision system as a whole. In so doing, the machine learning engine 126 performs a utility analysis on each of the PoE video sensors 102 by analyzing the contribution of each output of a PoE video sensor 102 to a predetermined objective function. For example, permutation importance of each PoE video sensor 102 can have different impacts of the ability of the RCVM system 100 to manage autonomous driving of the vehicles 106. PoE video sensors 102 having a higher impact are determined to be more important for functionality of the vision system. The combination of camera importance and severity of occlusion can be used to update a QTable.

The QTable is a tabulation method to prioritize which PoE video sensors 102 are to receive power and how much power is to be supplied by a particular PoE switch 104 when the power capable of being supplied by the particular PoE switch 104 is limited. The power management module 122 in conjunction with the machine learning engine 126 can change the state of the PoE video sensors 102 in the QTable based on the trended results or depth of the structured scene representation. The QTable can be updated over time where the reward is utility and occlusion magnitude for a certain device. An example Q learning algorithm for these purposes is illustrated in FIG. 4.

With reference to FIG. 5, pseudocode capable of performing a bin packing algorithm is disclosed. In this algorithm, the q value is assigned as the valuation of changing a PoE video sensors 102 while the cost of the power draw for that PoE video sensor 102. The bin packing algorithm is configured to determine how to allocate power from a particular PoE switch 104 to each of the PoE video sensors 102 found within the QTable. The cost of using power is related to the inverse of the QTable value. This involves maximizing the QTable given a bound of power allocated to each of the PoE video sensors 102. In other words, for each PoE video sensor 102, the bin packing algorithm looks to optimize the valuation and minimize the power required across all PoE video sensors 102 (and any other connected powered devices) connected to the PoE switch 104.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a Central Processing Unit (CPU), an array processor, a vector processor, a Digital Signal Processor (DSP), a Field-Programmable Gate Array (FPGA), a Programmable Logic Array (PLA), an Application Specific Integrated Circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
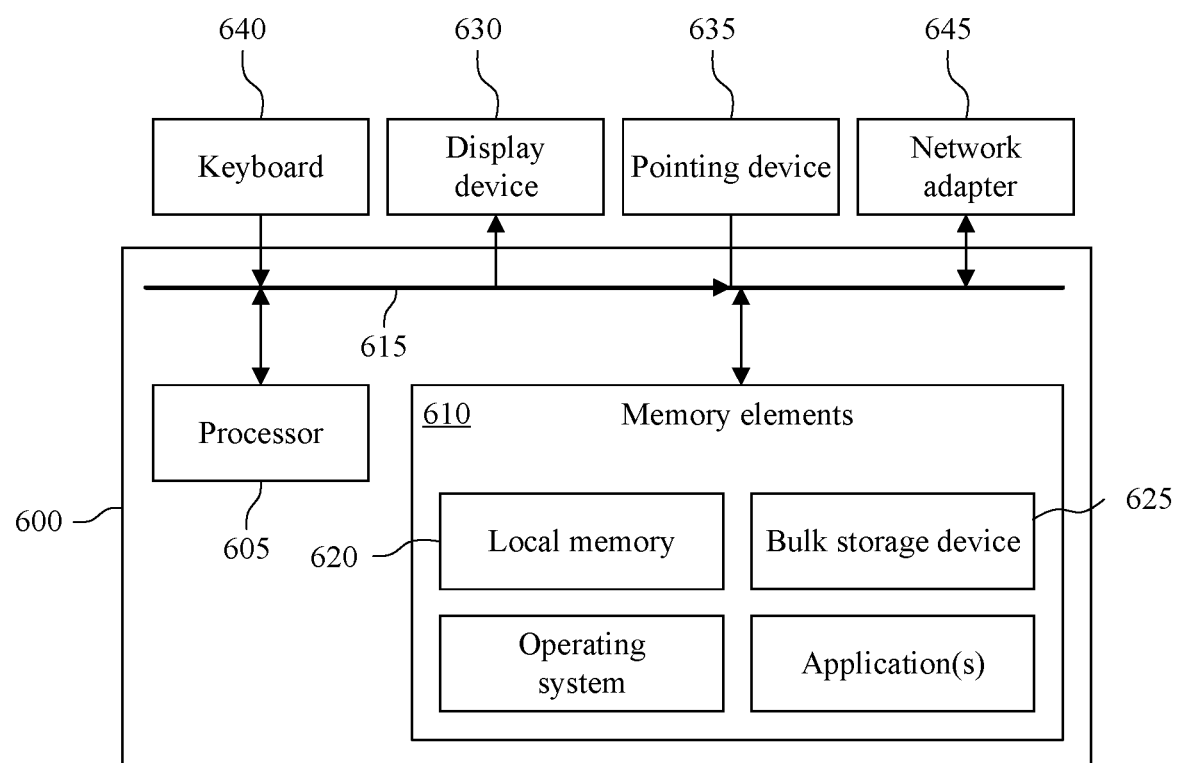
FIG. 6 is a block diagram illustrating an example of computer hardware system for implementing the RCVM system of FIG. 1A.

FIG. 6 is a block diagram illustrating example architecture for a data processing service 600 for executing the RCVM server 108. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to Random Access Memory (RAM) or other non-persistent memory device(s) generally used during actual execution of the program code. The bulk storage device(s) 625 can be implemented as a Hard Disk Drive (HDD), Solid State Drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/Output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a Graphics Processing Unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the RCVM server 108 of FIGS. 1A, 1B. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and Personal Digital Assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
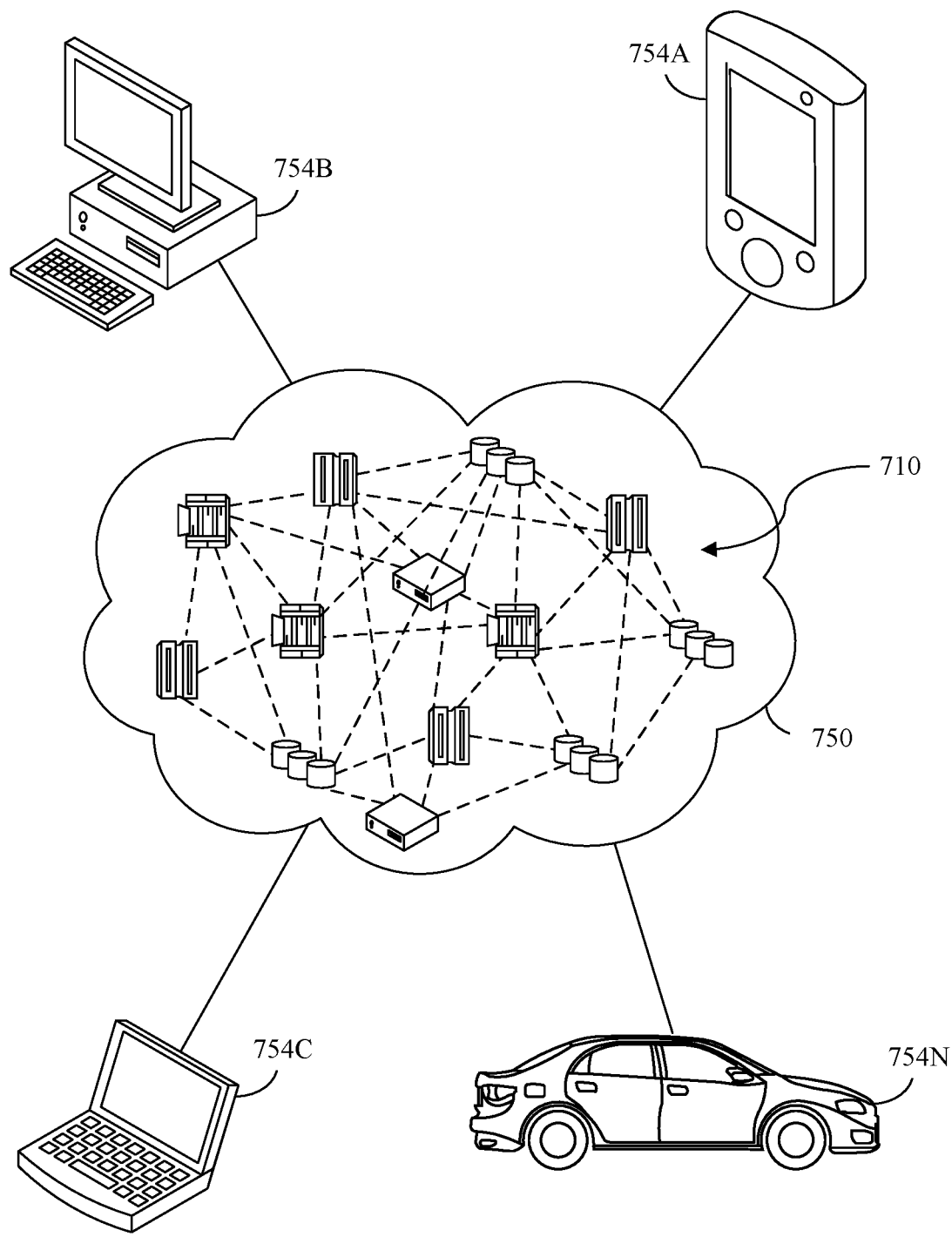
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, PDA or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
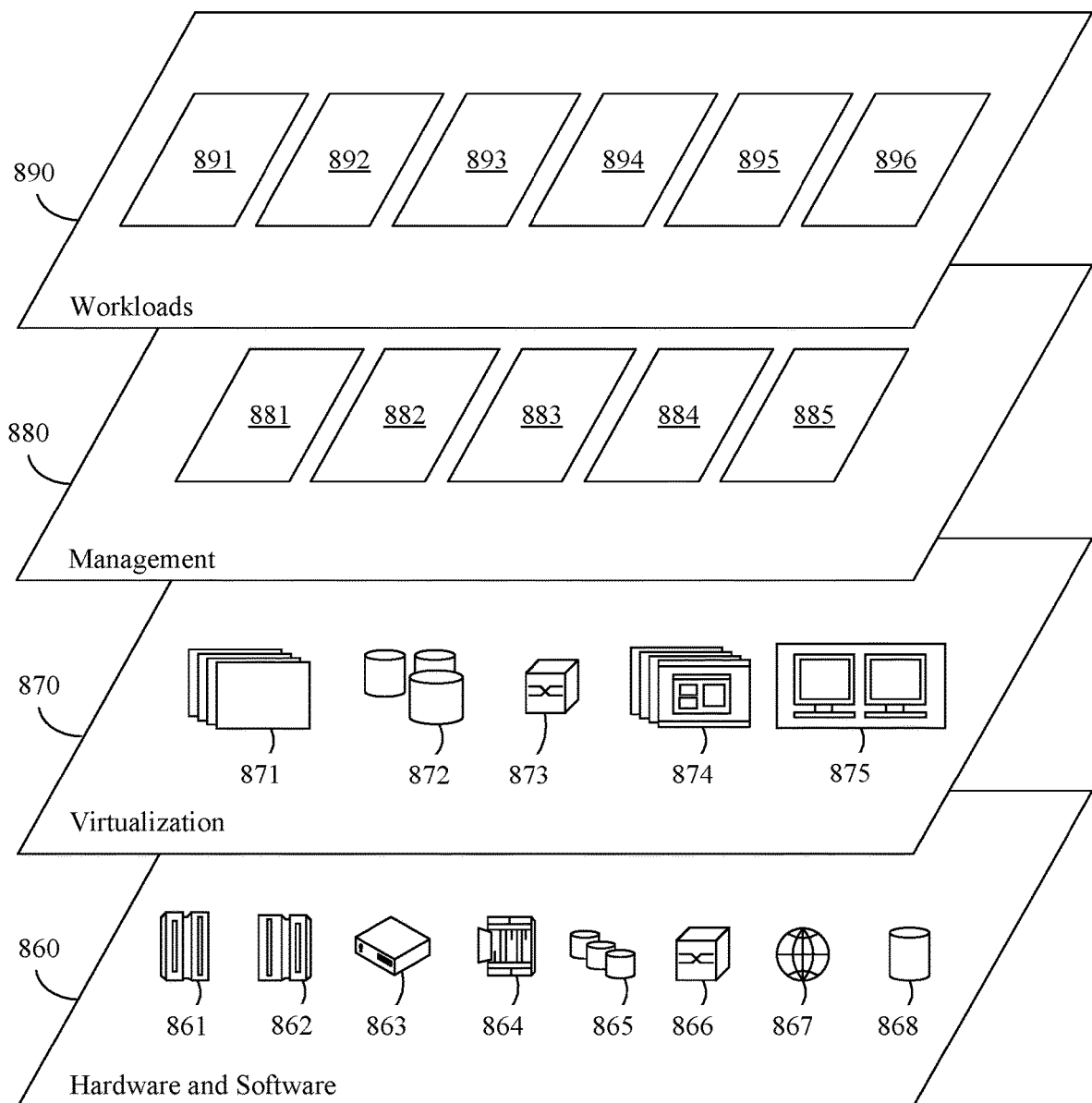
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the RCVM server 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method, within a remote controlled vehicle movement (RCVM) server, of regulating power from a Power-over-Ethernet (PoE) switch to a vision system including plurality of PoE vision sensors connected to the PoE switch, comprising:

performing, using a convolutional neural network, an evaluation of individual contributions that each of the plurality of PoE vision sensors makes to operational efficiency of the vision system;

receiving, from at least one of the plurality of PoE vision sensors, information indicative of a degradation condition to the at least one of the plurality of PoE vision sensors;

estimating, based upon the information indicative of the degradation condition, an amount of power needed to be supplied from the PoE switch to alleviate the degradation condition of the at least one of the plurality of PoE vision sensors;

making a determination that a total amount of power supplied from the PoE switch exceeds an available amount of power capable of being supplied from the PoE switch; and individually regulating in real-time, based upon the determination, power from the PoE switch to the plurality of PoE vision sensors using a prioritization determined according to the evaluation.

2. The method of claim 1, wherein
the machine learning engine includes a convolutional neural network employing combinatorial padding and stride to progressively detect the degradation condition.

3. The method of claim 1, wherein
the prioritization is based upon bin backing of power requirements for each of the plurality of PoE vision sensors based upon the evaluation.

4. The method of claim 1, wherein
the estimating includes adjusting the amount of power needed to be supplied from the PoE switch based upon a determination that one of the plurality of PoE vision sensors having a degraded condition does not impact operational efficiency of the vision system.

5. The method of claim 1, wherein
the estimating includes adjusting the amount of power needed to be supplied from the PoE switch based upon a determination that one of the plurality of PoE vision sensors having a degraded condition does not have a vehicle in range.

6. The method of claim 1, wherein
each of the plurality of PoE vision sensors include at least one mitigation function.

7. The method of claim 6, wherein
the individually regulating includes disabling the at least one mitigation function for a particular PoE vision sensor.

8. A remote controlled vehicle movement (RCVM) server including a computer hardware system configured to regulate power from a Power-over-Ethernet (PoE) switch to a vision system including plurality of PoE vision sensors connected to the PoE switch, comprising:

a hardware processor configured to perform the following executable operations:

performing, using a convolutional neural network, an evaluation of individual contributions that each of the plurality of PoE vision sensors makes to operational efficiency of the vision system;

receiving, from at least one of the plurality of PoE vision sensors, information indicative of a degradation condition to the at least one of the plurality of PoE vision sensors;

estimating, based upon the information indicative of the degradation condition, an amount of power needed to be supplied from the PoE switch to alleviate the degradation condition of the at least one of the plurality of PoE vision sensors;

making a determination that a total amount of power supplied from the PoE switch exceeds an available amount of power capable of being supplied from the PoE switch; and individually regulating in real-time, based upon the determination, power from the PoE switch to the plurality of PoE vision sensors using a prioritization determined according to the evaluation.

9. The system of claim 8, wherein
the machine learning engine includes a convolutional neural network employing combinatorial padding and stride to progressively detect the degradation condition.

10. The system of claim 8, wherein
the prioritization is based upon bin backing of power requirements for each of the plurality of PoE vision sensors based upon the evaluation.

11. The system of claim 8, wherein
the estimating includes adjusting the amount of power needed to be supplied from the PoE switch based upon a determination that one of the plurality of PoE vision sensors having a degraded condition does not impact operational efficiency of the vision system.

12. The system of claim 8, wherein
the estimating includes adjusting the amount of power needed to be supplied from the PoE switch based upon a determination that one of the plurality of PoE vision sensors having a degraded condition does not have a vehicle in range.

13. The system of claim 8, wherein
each of the plurality of PoE vision sensors include at least one mitigation function.

14. The system of claim 13, wherein
the individually regulating includes disabling the at least one mitigation function for a particular PoE vision sensor.

15. A computer program product, comprising:
a computer readable storage medium having stored therein program code,
the program code, which when executed by a remote controlled vehicle movement (RCVM) server including a computer hardware system configured to regulate power from a Power-over-Ethernet (PoE) switch to a vision system including plurality of PoE vision sensors connected to the PoE switch, cause the computer hardware system to perform:

performing, using a convolutional neural network, an evaluation of individual contributions that each of the plurality of PoE vision sensors makes to operational efficiency of the vision system;

receiving, from at least one of the plurality of PoE vision sensors, information indicative of a degradation condition to the at least one of the plurality of PoE vision sensors;

estimating, based upon the information indicative of the degradation condition, an amount of power needed to be supplied from the PoE switch to alleviate the degradation condition of the at least one of the plurality of PoE vision sensors;

making a determination that a total amount of power supplied from the PoE switch exceeds an available amount of power capable of being supplied from the PoE switch; and individually regulating in real-time, based upon the determination, power from the PoE switch to the plurality of PoE vision sensors using a prioritization determined according to the evaluation.

16. The computer program product of claim 15, wherein the machine learning engine includes a convolutional neural network employing combinatorial padding and stride to progressively detect the degradation condition.

17. The computer program product of claim 15, wherein the prioritization is based upon bin backing of power requirements for each of the plurality of PoE vision sensors based upon the evaluation.

18. The computer program product of claim 15, wherein the estimating includes adjusting the amount of power needed to be supplied from the PoE switch based upon a determination that one of the plurality of PoE vision sensors having a degraded condition does not impact operational efficiency of the vision system.

19. The computer program product of claim 15, wherein the estimating includes adjusting the amount of power needed to be supplied from the PoE switch based upon a determination that one of the plurality of PoE vision sensors having a degraded condition does not have a vehicle in range.

20. The computer program product of claim 15, wherein each of the plurality of PoE vision sensors include at least one mitigation function, and
the individually regulating includes disabling the at least one mitigation function for a particular PoE vision sensor.

* * * * *